J. PARISETTE.
Refrigerating Apparatus.
No. 219,975.  Patented Sept. 23, 1879.
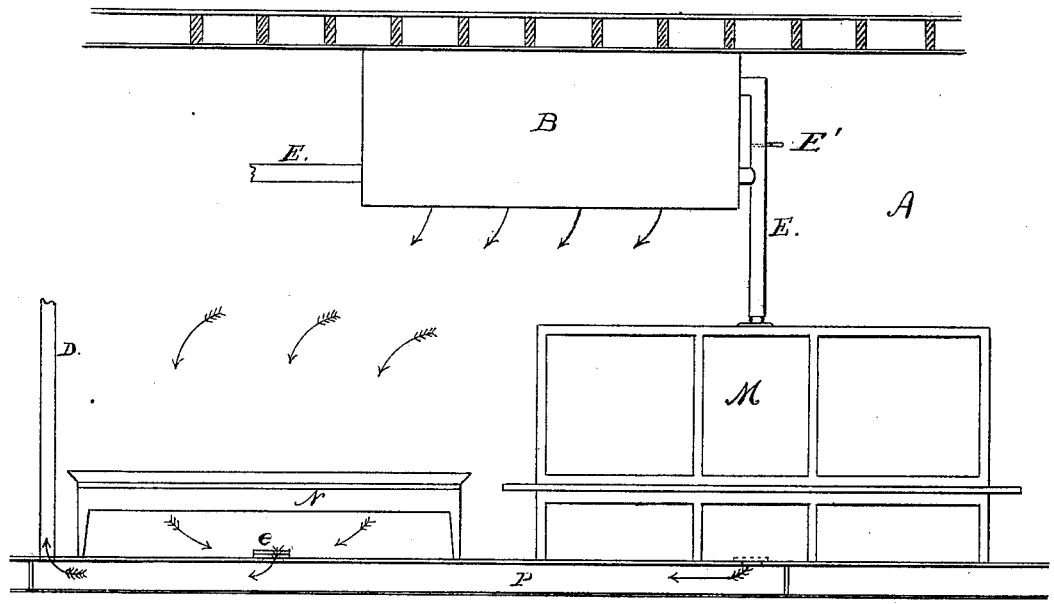
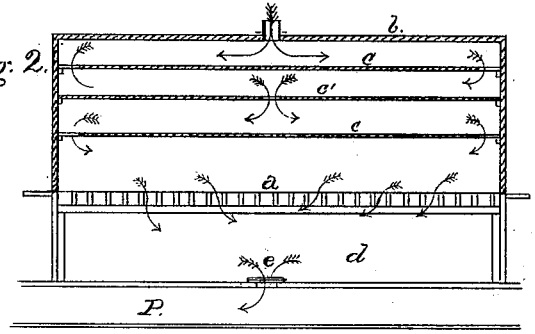

UNITED STATES PATENT OFFICE.

JOSEPH PARISETTE, OF INDIANAPOLIS, INDIANA, ASSIGNOR TO HIMSELF AND ROBERT L. McOUAT, OF SAME PLACE.

IMPROVEMENT IN REFRIGERATING APPARATUS.

Specification forming part of Letters Patent No. 219,975, dated September 23, 1879; application filed September 6, 1878.

*To all whom it may concern:*

Be it known that I, JOSEPH PARISETTE, of Indianapolis, in the county of Marion and State of Indiana, have invented certain Improvements in Refrigerating Apparatus, of which the following is a specification.

This invention relates to curing meats; and it consists in a close chest in which to place the meat to be cooled, said chest being connected with an ice or frigorific chest and a return or circulating duct, as hereinafter more fully described, whereby the air circulated over the meat is dried in the process of cooling it, so that the surface of the meat is exsiccated or partially dried before salting, the object being to so cure the meat that the albuminous juices will be retained, and the osmazome fixed therein in a more perfect manner than heretofore, thereby greatly improving the quality and enhancing the value of the meat. This apparatus for cooling and exsiccating the meat is especially applicable to use in connection with the cooling apparatus for which Letters Patent were heretofore granted to me—viz., No. 147,281, February 10, 1874, and No. 176,146, April 18, 1876—in which the mode of continuously circulating the air alternately through the cooling-chamber A and the refrigerating or air-cooling chamber B is fully described.

The exsiccating-chamber M of my present invention is placed in the cooling-chamber A, (described in the Letters Patent referred to above,) and is connected directly with the horizontal pipe E, which is arranged near the bottom of the refrigerating-chest B, and is made detachable, so that it may be readily disconnected when desired. When, however, the chest M is to be used in connection with the pipes E of the refrigerating-chest B, having the circulating-pipes arranged as shown in the Letters Patent of April 18, 1876, the valves E' are to be set so as to direct the flow of air into the chest M, instead of being returned upward into chest B.

In the accompanying drawings, Figure 1 is a view of the interior of the cooling-chamber A and ice or refrigerant chest B, (described in the above-mentioned Letters Patent,) showing in connection therewith the arrangement of the close exsiccating and cooling chest M and salting-table N of my present invention, together with the air returning or circulating duct P, which connects the same with the induction-pipe D of the air-pump or fan-blower, as described in said Letters Patent.

Fig. 2 is a vertical longitudinal section of the cooling and exsiccating chest M. The chest M consists of a table, $a$, of any required size, the top of which is composed of suitable slats with intervening spaces, on which to pile the meat; an air-tight case or cover, $b$, in which shelving $c\ c'$, on which to lay meat, may be arranged; and the inclosed base $d$. The shelves $c$ have openings or air-passages at the ends, and the shelves $c'$ have openings in the middle, so as to cause the air to circulate over the meat, as indicated by the arrows. Provision may also be made for hanging meat to the under side of shelves $c\ c'$, and, when desired, the shelves may be dispensed with, and the meat hung to the top and around the sides of the chest.

From the space $d$, under the slatted table-top $a$, the air is drawn through an opening, $e$, in the floor, arranged at about the center of the chest M, and which connects with a pipe, P, under the floor, leading to the induction-pipe D of the pump or fan-blower, as described in the Letters Patent above referred to, whereby the air is continuously circulated alternately over and in contact with the meat in chest M, and then returned to and through the refrigerant-chest B, in the pipes E of which the moisture in the air is congealed or condensed.

After the meat is cooled and exsiccated in chest M until all the animal heat is extracted, and the surface sufficiently dried to retain the albuminous juices, it is removed to a table, N, also situated at any convenient position in chamber A, to be salted. The table N is made with solid top formed into a shallow tray, and furnished with a cock to draw off any liquid that may accumulate therein. Through an opening, $e$, in the floor, about under the center of the table, and which also connects with pipe P, the air is drawn from chamber A. When placed on this table the meat is closely covered with any suitable covering that will exclude the air, and yet permit its cooling effect upon the meat. When this table is used, the chest M is to be disconnected from the pipe E, so that the cooled air will flow out into chamber A, and be drawn toward and over and around the table N in its egress into pipe P in the floor, through the opening e, thereby concentrating its cooling effects upon the table and its contents. Each of the openings e in the floor, underneath the chest M and table N, is furnished with a valve by which to regulate the flow of air.

The case b of chest M is furnished with suitable doors, through which to put in and remove the meat, and the base d, underneath the table a, is also furnished with a door to afford access to valves of openings e.

The operation of the device to carry out my present invention is as follows: The air, in its passage through pipe E being cooled to the greatest practical degree, is dried by the condensation of its moisture on the interior of the pipe, which then, in its circulation over the meat, as described, has the effect to both abstract the animal heat and to absorb the moisture, and thus exsiccate or partially dry the surface, thereby retaining the albuminous juices and fixing the osmazome. When the meat has been subjected to this process until all animal heat is abstracted, it is then transferred to the salting-table N and salted, in the usual manner, being closely covered in any manner to prevent direct contact with the moist air of chamber A, which would remoisten the surface of the meat and permit the escape of the juices, thereby defeating the object of the first part of the process.

As in moist climates it is the tendency of meat to absorb moisture from the air, which dissolves its albuminous juices and osmazome, and allows them to escape therefrom, and at the same time evolving heat by the fermentation caused by the oxygen that is contained in the moisture combining with the carbon of the meat, it is important that it should be kept from exposure to the moist air during the process of salting, and until the albumen is coagulated and the osmazome is fixed. This is accomplished by closely covering the salted meat on table N, as above described, and keeping it as cool as practicable by placing the table over the opening e in the floor which communicates with the return-duct P, whereby the cooled air from chest B is compelled to circulate over, under, and around it.

Meats cured in this manner are better adapted to broiling or frying, and they will keep sweet and palatable longer than meats exposed to the direct action of the air in the process of curing as usually done.

I do not make any claim to placing a table or tables in the refrigerating-chamber A, in itself considered.

I claim as my invention—

The cooling and exsiccating chamber M, in combination with the frigorific chest B and return-duct P, substantially as and for the purpose set forth.

JOSEPH PARISETTE.

Witnesses:
O. F. MAYHEW,
W. B. SEWARD.